US007372021B2

(12) United States Patent
Cotter et al.

(10) Patent No.: US 7,372,021 B2
(45) Date of Patent: May 13, 2008

(54) TIME-OF-FLIGHT MASS SPECTROMETER COMBINING FIELDS NON-LINEAR IN TIME AND SPACE

(75) Inventors: Robert James Cotter, Baltimore, MD (US); Benjamin D. Gardner, Owings Mills, MD (US); John F Holland, Haslett, MI (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 11/352,301

(22) Filed: Feb. 13, 2006

(65) Prior Publication Data

US 2007/0029474 A1 Feb. 8, 2007

Related U.S. Application Data

(63) Continuation of application No. 10/516,131, filed as application No. PCT/US03/16777 on May 30, 2003, now abandoned.

(60) Provisional application No. 60/384,344, filed on May 30, 2002.

(51) Int. Cl.
*H01J 49/00* (2006.01)
*B01D 59/44* (2006.01)

(52) U.S. Cl. ...................... 250/287; 250/281; 250/282; 250/286; 250/423 P

(58) Field of Classification Search ..................... None
See application file for complete search history.

(56) References Cited

U.S. PATENT DOCUMENTS

| | | | | |
|---|---|---|---|---|
| 4,458,149 | A | 7/1984 | Muga | |
| 5,015,848 | A * | 5/1991 | Bomse et al. | 250/281 |
| 5,032,722 | A | 7/1991 | Boesl et al. | |
| 5,861,623 | A * | 1/1999 | Park | 250/287 |
| 5,969,348 | A | 10/1999 | Franzen | |
| 6,521,887 | B1 * | 2/2003 | Funsten et al. | 250/287 |

FOREIGN PATENT DOCUMENTS

| | | | |
|---|---|---|---|
| DE | 44 42 348 | A1 | 5/1996 |
| WO | WO 00/76638 | A1 | 12/2000 |

* cited by examiner

*Primary Examiner*—Jack I. Berman
*Assistant Examiner*—Zia R. Hashmi
(74) *Attorney, Agent, or Firm*—Pillsbury Winthrop Shaw Pittman LLP

(57) ABSTRACT

A time-of-flight mass spectrometer which has an iron source, an evacuated tube proximate the ion source and adapted to receive ions from the ion source, and a detector disposed at an end of the evacuated tube opposite an end proximate the ion source. The ion source is constructed to generate an electric field that changes non-linearly as a function of position along a path from the ion source to the detector. The ion source is constructed to generate an electric field that changes as a function of time, the electric field being provided to accelerate ions from the ion source to the detector.

19 Claims, 11 Drawing Sheets

TIME-OF-FLIGHT MASS SPECTROMETER COMBINING FIELDS NON-LINEAR IN TIME AND SPACE

RELATED APPLICATIONS

This is a Continuation application of U.S. patent application Ser. No. 10/516,131, filed Nov. 30, 2004, which is the U.S. national phase of International Application No. PCT/US03/16777, filed May 30, 2003, which, in turn, is based on U.S. Provisional Application No. 60/384,344, filed May 30, 2002, the entire contents of all of which are hereby incorporated by reference in their entireties.

PRIOR PROVISIONAL APPLICATION INFORMATION

This Application is based on Provisional Application No. 60/384,344 filed May 30, 2002, the entire contents of which is hereby incorporated by reference.

STATEMENT AS TO RIGHTS TO INVENTIONS MADE UNDER FEDERALLY SPONSORED RESEARCH AND DEVELOPMENT

The present invention was conceived during the course of work supported by grant No. GM64402 from the National Institutes of Health and DARPA grants NDCH102007 and DABT63-99-1-0006.

BACKGROUND OF THE INVENTION

1. Field of Invention

The present invention relates to a mass spectrometer in general and in particular to a mass spectrometer that employs ion focusing fields which are non-linear in both space and time to improve mass resolution.

2. Description of Related Art

Mass spectrometers are instruments that are used to determine the chemical composition of substances and the structures of molecules. In general they consist of an ion source where neutral molecules are ionized, a mass analyzer where ions are separated according to their mass/charge ratio, and a detector. Mass analyzers come in a variety of types, including magnetic field (B) instruments, combined electric and magnetic field or double-focusing instruments (EB or BE), quadrupole electric field (Q) instruments, and time-of-flight (TOF) instruments. In addition, two or more analyzers may be combined in a single instrument to produce tandem (MS/MS) mass spectrometers. These include triple analyzers (EBE), four sector mass spectrometers (EBEB or BEEB), triple quadrupoles (QqQ) and hybrids (such as the EBqQ).

In tandem mass spectrometers, the first mass analyzer is generally used to select a precursor ion from among the ions normally observed in a mass spectrum. Fragmentation is then induced in a region located between the mass analyzers, and the second mass analyzer is used to provide a mass spectrum of the product ions. Tandem mass spectrometers may be utilized for ion structure studies by establishing the relationship between a series of molecular and fragment precursor ions and their products.

Alternatively, they are now commonly used to determine the structures of biological molecules in complex mixtures that are not completely fractionated by chromatographic methods. These may include mixtures of (for example)

peptides, glycopeptides or glycolipids. In the case of peptides, fragmentation produces information on the amino acid sequence.

One type of mass spectrometer is time-of-flight (TOF) mass spectrometers. The simplest version of a time-of-flight mass spectrometer, illustrated in FIG. 1A (Cotter, Robert J., Time-of-Flight Mass Spectrometry: Instrumentation and Applications in Biological Research, American Chemical Society, Washington, D.C., 1997), the entire contents of which is hereby incorporated by reference, consists of a short source region 10, a longer field-free drift region 12 and a detector 14. Ions are formed and accelerated to their final kinetic energies in the short source region 10 by an electric field defined by voltages on a backing plate 16 and drawout grid 18. The longer field-free drift region 12 is bounded by drawout grid 18 and an exit grid 20.

In the most common configuration, the drawout grid 18 and exit grid 20 (and therefore the entire drift length) are at ground potential, the voltage on the backing plate 16 is V, and the ions are accelerated in the source region to an energy: $mv^2/2=z\,eV$, where m is the mass of the ion, v is its velocity, z the number of charges, and e is the charge on an electron. The ions then pass through the drift region 12 and their (approximate) flight time(s) is given by the formula:

$$t=[(m/z)/2\ eV]^{1/2}D \tag{I}$$

which shows a square root dependence upon mass. Typically, the length s of source region 10 is of the order of 0.5 cm, while drift lengths (D) ranges from 15 cm to 8 meters. Accelerating voltages (V) can range from a few hundred volts to 30 kV, and flight time are of the order of 5 to 100 microseconds. Generally, the accelerating voltage is selected to be relatively high in order to minimize the effects on mass resolution arising from initial kinetic energies and to enable the detection of large ions. For example, the accelerating voltage of 20 KV (as illustrated, for example, in FIG. 1A) has been found to be sufficient for detection of masses in excess of 300 kDaltons.

A profile of the acceleration potential in the source region 10 (shown in FIG. 1A) is shown in FIG. 1B. The potential in this embodiment decreases linearly from a maximum value at the backing plate 16 (shown in FIG. 1A) to zero at the drawout grid 18 (Shown in FIG. 1A).

In recent years, the development of an ionization technique for mass spectrometers known as matrix-assisted laser desorption ionization (MALDI) has generated considerable interest in the use of time-of-flight mass spectrometers and in improvement of their performance. MALDI is particularly effective in ionizing large molecules (e.g. peptides and proteins, carbohydrates, glycolipids, glycoproteins, and oligonucleotides(DNA)) as well as other polymers. The TOF mass spectrometer provides an advantage for MALDI analysis by simultaneously recording ions over a broad mass range, which is the so called multichannel advantage. In the MALDI method of ionization, biomolecules to be analyzed are recrystallized in a solid matrix (e.g., sinnipinic acid, 3-hydroxy picolinic acid, etc.) of a low mass chromophore that is strongly absorbing in the wavelength region of the pulsed laser used to initiate ionization. Following absorption of the laser radiation by the matrix, ionization of the analyte molecules occurs as a result of desorption and subsequent charge exchange processes. In TOF instruments, all ion optical elements and the detector are enclosed within a vacuum chamber to ensure that ions, once formed, reach the detector without collisions with the background gas.

One performance criterion for all TOF mass spectrometers is the resolving power, which represents the extent to which ions of different m/z can be distinguished from each other. Ideally, nearly infinite resolving power could be attained if all ions having the same m/z would arrive at the detector simultaneously. This ideal circumstance could be achieved if 1) all the ions possessed identical (or no) initial energy or motion, 2) all started from the same point, and 3) all were accelerated to identical kinetic energy. However, any one of these conditions is rarely achieved and the resolving power is consequently diminished. Therefore, some mechanism or combination thereof must be used to compensate for these variations in ion starting conditions in order to attain sufficient resolving power.

For a gaseous sample, there is both a distribution of initial ion starting positions and a thermal Maxwell-Boltzman distribution of ion energies (~0.1 eV) that is subsequently manifested as a distribution of ion detection times within each iso-mass group. These temporal variations are often referred to as the space and energy effects. The energy effect also creates a distinct detrimental effect known as the turn-around time, whereby those ions having a thermal energy vector directed against the accelerating field travel away from the ion source exit before being turned around.

This results in ions of the same m/z, same initial position, and same magnitude of thermal energy, exiting the ion source at different times and consequently results in a difference in arrival-times at the detector.

The three ions' starting parameters are modeled, for the single, linear field case and shown in FIG. 2. The effect of each case can be compared with the reference ion of the same mass located at the initial position $s_0$, with no internal energy. The energy, $U_{s0}$, applied to the reference ion is $$U_{s_0}=s_0E \tag{II}$$

which represents the total kinetic energy of the reference ion. It is assumed that ions originating from the same plane, orthogonal to the flight axis, receive equal kinetic energy when the accelerating field is applied.

In the first case S, an ion initially located at a position $s_0+\delta s$, receives a total energy directly proportional to its initial position when the accelerating electric field is applied. The energy applied to this ion will differ from $U_{s0}$ by the relationship $$U_s = \frac{s_0+\delta s}{s_0}U_{s_0} \tag{III}$$

Ions located farther from the exit of the ion source receive greater energy than those ions closer to the exit and overtake the less energetic ions at a distance $2s_0$ from the ion source exit; a phenomenon known as space focusing. The location along the flight axis where this occurs, in this case $2s_0$, is traditionally known as the space focus plane and represents the position along the flight path where $R_s$, that portion of the resolving power attributable to space focusing, is the highest.

In the case of U+, an ion having some initial energy δU and an initial velocity directed toward the detector is compared to the reference ion located in the same plane. While both ions receive a total energy of $U_s$ as a consequence of their location within the source, the ion having the initial thermal motion leaves the source with a final energy of $U_s+\delta U$, achieves a greater velocity and arrives at the detector before the reference ion. Methods correcting for this variance are known as energy focusing methods, discussed below.

In the special case of U−, the initial energy δU is the same, but the initial velocity is directed away from the detector, and the ion initially travels against the electric field before being turned around and accelerated out of the source. For two ions of the cases U+ and U− where both ions have the same magnitude of initial energy but velocities in opposite directions, each ion will leave the source with identical energy. However, the U− ion will arrive at the detector later due to the turn-around time in the ion source.

The resolving power is independently degraded by each of the starting parameters, with the overall resolving power representing the combined effect of the space and energy resolutions. The total resolving power, R, is defined as $$\frac{1}{R} = \frac{1}{R_S} + \frac{1}{R_{U+}} + \frac{1}{R_{U-}} + \frac{1}{R_t} + \frac{1}{R_{electronics}} \tag{IV}$$

While not a fundamental parameter of ion motion, the term $R_t$ is included for those cases where ions may be formed during the finite time of ion extraction from the source. The term $R_{electronics}$ is also included here to acknowledge that in practice, if all ion space and energy effects can be corrected or eliminated, the ultimate limitation to R is that imposed by the speed and precision of the detector and electronics circuitry.

Improvements to Resolving Power

The first major improvement to resolving power incorporated two design features that improved both mass resolving power and overall mass range. The first of these was the development of the two-field ion source (Wiley, W. C., McLaren, I. H. Rev. Sci. Instrumen. 1955, 26, 1150-1157; Wiley, W. C. Science, 1956, 124, 817-820; Wiley, W. C. U.S. Pat. No. 2,685,035).

Earlier ion sources used a single electric field for ion extraction that imposed a tradeoff between energy and space focusing. FIG. 3A shows a graph of the voltage potential versus the length $s_0$ between the ion source (backing-plate) and the drawout grid or exit grid. The voltage potential decreases linearly to reach zero volt at the exit grid, illustrated in FIG. 3A by a dotted vertical line. The focus position lies at a distance of $2s_0$ from the exit grid. The focus position is indicated on FIG. 3A by a vertical line.

In order to maximize energy resolution, it was desirable to use a high electric field strength and accelerate the ions to their final velocity quickly. However, this required an axially short ion source geometry and, as the detector must consequently be placed only a short distance ($2s_0$) from the ion source in order to achieve a space focus condition, little time was available for mass separation. The total flight time could only be increased by either lowering the electric field strength (and consequently the energy resolution), or lengthening the flight path by moving the detector well beyond where the space focus region would be found using a single field source.

Since the dominant parameter limiting resolving power was the initial energy spread, the latter option was required. Using the two-field ion source, as shown in FIG. 3B, the space focus region could be located farther than $2s_0$ from the ion source at a distance which is a function of the two accelerating electric field strengths. Thus, while the low amplitude first accelerating field slightly reduced the energy resolution, the ability to achieve both space focusing and an increase in the total flight time for all ions yielded an overall increase in resolving power.

The second early design provided additional focusing by introducing an adjustable time delay between ion formation and application of the accelerating field (Wiley, W. C., McLaren, I. H. Rev. Sci. Instrumen. 1955, 26, 1150-1157; Wiley, W. C. Science, 1956, 124, 817-820; Wiley, W. C. U.S. Pat. No. 2,685,035). During this time, ions move to new locations in the ion source due to their thermal energies and, upon extraction, acquire total kinetic energies dependent on these new locations. This energy focusing method, known then as time-lag focusing and now as pulsed or delayed extraction, essentially attempts to transform the energy distribution of the initial ion population into a spatial distribution, thus reducing the temporal effect of the energy distribution at the space focus position. The combined use of time-lag and space focusing yields a significant increase in resolving power. However, the optimal time lag is mass dependent, limiting the m/z range that could be simultaneously measured.

Another way to improve the resolving power is with the use of a reflectron or ion mirror, which provides mass-independent ion focusing (Karataev, V. I., Mamyrin, B. A., Shmikk, D. V. Sov. Phys. Tech. Phys. 1972, 16, 1177; Mamyrin, B. A., Karataev, V. I., Shmikk, D. V., Zagulin, V. A. Sov. Phys. JETP 1973, 37, 45; Mamyrin, B. A., Shmikk, D. V. Sov. Phys. JETP 1979, 49, 762; Mamyrin, B. A., Karataev, V. I., Shrmikk, D. V. U.S. Pat. No. 4,072,862).

In its most basic form, as shown in FIG. 4A, this device is simply a series of electrostatic diaphragms that provide a retarding electric field, as shown in FIG. 4B, with enough potential to reflect ions. Ions with different kinetic energies penetrate the mirror to different depths before being turned around and repelled from the mirror. While all ions leave the mirror having exactly the same magnitude of energy with which they entered, those ions possessing the greater energy travel farther into the mirror before being repelled and thus experience a time delay that compensates for their higher velocity in the field-free region. The ions are then focused at a second space-focus position SFP2 where they achieve a higher resolving power than the first space-focus position SFP1 due to the additional energy focusing. The original ion mirror design generates a single, linear electric field behind a field isolating mesh and is capable of first-order focusing. A subsequent design incorporates two fields and is capable of first or second-order focusing.

Non-Linear Fields

Mass spectrometers using linear-field or combinations of linear-field focusing devices such as the two-field ion source and the two-field ion mirror generate adequate resolving power for applications having a relatively small initial ion energy distribution. However, for applications having a relatively large initial ion energy distribution, the achievable resolving power is diminished. This is expected since the relationship between energy, velocity and time is fundamentally non-linear, and linear-field devices provide only an approximation of complete temporal focusing. One approach to compensate for this overcomes the energy focusing limitation by delivering externally-generated ions to the TOF mass analyzer in a direction orthogonal to the analysis axis [11,12]. Thus, while the overall magnitude of initial ion energy may be relatively large, the magnitude along the analysis axis is minimal. However, this still does not overcome the spatial problem, and for some methods where the ionization process occurs within the source, a large initial ion energy distribution may inherent to the analysis.

The fundamentally non-linear relationship between time and energy in ion motion indicates that the ultimate attainable resolving power can only be achieved using non-linear fields. Devices that generate non-linear fields can be classified as static, where the non-homogeneous field is established in space using a particular electrode design, and dynamic, where the magnitude of the electric field is altered over time.

Static Field Devices

To date, the majority of development in non-linear-field generating devices has been with static devices. Several ion mirror designs using a non-linear field have been developed (Glashchenko, V. P., Semkin, N. D., Sysoev, A. A., Oleinikov, V. A., Tatur, V. Yu. Sov. Phys. Tech. Phys. 1985, 30, 540-541; Mamyrin, B. A. Int J. Mass Spectrom. Ion Processes, 1994, 131, 1-19; Rockwood, A. L. Proc. 34$^{th}$ ASMS Conf. on Mass Spectrom & Allied Topics, 1986, Cincinnati, Ohio, 173), while other designs have been proposed and/or patented (Yoshida, Y. U.S. Pat. No. 4,625,112; Frey, R., Schlag, E. W. U.S. Pat. No. 4,731,532; Kutscher, R., Grix, R., Li, G.; Wollnik, H. U.S. Pat. No. 5,017,780; Managadze, G. G., Shutyaev, I. Yu. In Laser Ionization Mass Spectrometry; Vertes, A., Gijbels, R., Adams, F., Eds., John Wiley & Sons: New York, 1993, 505-549; Flory, C. A., Taber, R. C., Yefchak, G. E. Int. J. Mass Spectrom. Ion Proc. 1996, 152, 177-184; Doroshenko, V. M., Cotter, R. J. J. Am. Soc. Mass Spectrom., 1999, 10, 992-999; Cotter, R. J., Doroshenko, V. M. U.S. Pat. No. 6,365,892). Each of these designs provides only minor improvement to the resolving power achieved using linear-field ion mirrors, and each is suitable to only a relatively narrow initial range of ion energies.

Non-linear-field mirrors that focus a broad range of initial ion energies have also been developed using either an entirely gridless design to achieve a single non-linear field (Cornish, T. J., Cotter, R. J. Rapid Comm. Mass Spectrom., 1993, 7, 1037-1040), or a gridded design generating a combination of linear and non-linear fields (Beussman, Douglas J., Vlasak, Paul R., McLane, Richard D.; Seeterlin, Mary A.; Enke, Christie G. Anal. Chem. 1995, 67(21), 3952-3957). While non-linear fields are theoretically preferable to linear fields, one of the practical drawbacks to generating such fields in ion mirrors is the result of their inherent radial field-inhomogeneity. Linear fields generate an electric potential that is constant in all directions orthogonal to the electric field. Thus, an ion beam entering a linear-field ion mirror at a fixed point and angle will experience the same force regardless of the entry point. In contrast, an ion beam entering a non-linear field will experience a force that depends on the exact point of entry. An ion beam of finite diameter will thus experience a range of non-linear fields, which reduces the resultant resolving power and radially disperses the ion beam, diminishing the ion transmission. A non-linear design has been developed that exploits the radial dispersion using a single-electrode can-shaped "endcap" ion mirror (Cornish, T. J., Cotter, R. J. Anal. Chem. 1997, 69(22), 4615-4618; Cornish, T. J.; Cotter, R. J. U.S. Pat. No. 5,814,813). A more recent and somewhat more complicated design also uses a minimum number (2 to 3) of electrodes to achieve the desired non-linear field (Zhang, J., Enke, C. G. J. Am. Soc. Mass Spectrom., 2000, 11(9), 759-764; Zhang, J., Gardner, B. D., Enke, C. G. J. Am. Soc. Mass Spectrom., 2000, 11(9), 765-769; Zhang, J., Gardner, B. D., Enke, C. G. patent pending).

In contrast to the developments in non-linear ion mirror design, the use of non-linear fields in ion source design is less prevalent. Several designs have been developed, for the analysis of gas-phase ions, where a "quadratic" non-linear ion-accelerating field is generated (Crane, W. S., Mills, A. P. Rev. Sci. Instrum. 1985, 56, 1723; Hulett, L. D., Donohue, D. L., Lewis, T. A. Rev. Sci. Instrum. 1991, 62, 2131-2137; Rockwood, A. L., Udseth, H. R., Gao, Q., Smith, R. D. Proc. 42$^{nd}$ ASMS Conf. on Mass Spectrom. & Allied Topics, 1994, Chicago, Ill., 1038). A mass spectrometer based on one of these designs, for the analysis of orthogonally-injected gas-phase ions, is commercially available (LECO Corp. product literature on the Jaguar LC-TOF mass spectrometer). A separate design incorporating both linear and non-linear fields has been reported (Gardner, B. D., Holland, J. F. J. Am. Soc. Mass Spectrom., 1999, 10(11), 1067-1073; Gardner, B. D. Doctoral Dissertation, Michigan State University, 1997), also for the analysis of gas-phase ions. A gridless ion source, which consequently generates a non-linear field by default, is also commercially available on a MALDI-TOF instrument, although the design has not been described (Kratos Analytical Instruments AXIMA).

Dynamic Field Devices

Several dynamic-field ion optical devices have been developed. The technique of post source pulse focusing is a simple variation of time-lag focusing where a voltage pulse can be applied to a short field-free region located after the ionization and acceleration regions (Kinsel, G. R.; Johnston, M. V. Int. J. Mass Spectrom. Ion Phys. 1989, 91, 157). Properly timed, the pulse could be applied once the ions of interest have entered the region and thus provide discrete focusing. A velocity compaction technique was proposed (Muga, M. L. Anal. Instrum. 1987, 16, 31), in which a synchronized, continuously increasing potential is applied to the drift region subsequent to ion extraction. This increases the velocity of all ions as they travel toward the detector. However, those ions farthest from the detector in a given isomass packet experience a greater increase in energy, allowing them to catch up to those ions closer to the detector, and thus decrease the temporal distribution of the ion packet. A similar technique called dynamic field focusing (DFF) (Yefchak, G. E., Enke, C. G., Holland, J. F. Int. J. Mass Spectrom. Ion Phys. 1989, 87, 313) was modeled, where the synchronized potential was increased only on the latter portion of an initial drift region. More recently, mass-correlated acceleration has been developed, where a synchronized dynamic field is located directly at the ion source exit (Kovtoun, S. V. Rapid Commun. Mass Spectrom. 1997, 11, 433-436; Kovtoun, S. V. Rapid Commun. Mass Spectrom. 1997, 11, 810-815; Kovtoun, S. V.; Cotter, R. J. J. Am. Soc. Mass Spectrom. 2000, 11, 841-853).

For the analysis of a 3-dimensional ion population having a random vector distribution of thermal energies, the effect of static and dynamic non-linear fields can be qualitatively described using FIGS. 5A-5D. FIGS. 5A and 5B show the graphs of the potential applied function of the distance S0. As shown in FIG. 5A', the time required to exit a single-field ion source is plotted as a function of total energy for three series of ions having the same m/z and beginning from various starting positions centered about a grand average, $S_0$ (as shown in FIG. 5A). Measuring the time of flight required to reach the ion source exit reveals that the initial spatial distribution is the primary factor contributing to the temporal distribution. At a distance of $2S_0$ beyond the ion source exit (FIG. 5B), space focusing is achieved and the ion population achieves a reduction in the temporal distribution (FIG. 5B'). However, even under optimum conditions, using linear fields in either a single-stage or dual-stage ion source configuration with first or second-order focusing, the temporal distribution resulting from the initial spatial distribution can be minimized but not eliminated.

As shown in FIG. 5C, the use of a non-linear-field ion source (Kovtoun, S. V., Cotter, R. J. U.S. Patent Pending, WO 0076638) has been demonstrated to achieve a complete space focus, further reducing the overall temporal distribution (FIG. 5C') with the primary remaining temporal distribution being a function of the initial energy distribution.

A fundamental property of this non-linear theory predicts that the inclusion of a subsequent temporally static energy-correcting device such as an ion mirror should reduce the temporal distribution due to the initial energy spread. However, such devices cannot completely eliminate the distribution due to the fact that some ions in the initial ion population have positive initial energy vectors while others have negative initial energy vectors (i.e. the turn-around effect). One method for overcoming this phenomenon incorporates a short-duration, high amplitude voltage pulse to the back plate of the ion source prior to ion ejection in order to bias the initial energy distribution of the entire ion population to positive vectors (Sanzone, G. Rev. Sci. Instrum. 1970, 41, 741; Marable, N. L., Sanzone, G. Int. J. Mass Spectrom. Ion Phys. 1974, 13, 185). However, for ion populations possessing both positive and negative vectors, complete energy focusing is not possible.

The remaining problem of reducing the temporal distribution due to the initial energy spread can only be solved using a dynamic field, as shown in FIG. 5D and FIG. 5D'. Here, a combination of static and dynamic non-linear fields is required to achieve the maximum resolving power possible. One presentation suggesting the combined use of dynamic mass correlated acceleration and a static non-linear ion mirror has recently been proposed (Bowdler, A. R., Cotter, R. J.; Kovtoun, S. V. Proc. of the 49$^{th}$ ASMS Conf. on Mass Spectrom. And Allied Topics; Chicago, Ill., May, 2001). However, this was proposed for the limited analysis of MALDI-generated ions and has not been thoroughly developed. It also does not account for a static non-linear-field ion source.

SUMMARY OF THE INVENTION

An aspect of the present invention is to provide a time-of-flight mass spectrometer, including an ion source, an evacuated tube proximate the ion source and adapted to receive ions from the ion source, and a detector disposed at an end of the evacuated tube opposite an end proximate the ion source. The ion source is constructed to generate an electric field that changes non-linearly as a function of position along a path from the ion source to the detector. Furthermore, the ion source is constructed to generate an electric field that changes as a function of time and the electric field is provided to accelerate ions from the ion source to the detector.

In one embodiment, the magnitude of a spatial distribution of the electric field changes as a function of time. The shape of a spatial distribution of the electric field can also change as a function of time.

In another embodiment, the ion source further provides a delay pulse to allow for the dissipation of neutral molecules and free-radical chemical species. The ion source can also further provide a short-duration, high-amplitude voltage pulse prior to ion ejection from the source in order to bias an initial energy distribution of an ion population.

In another embodiment, the mass spectrometer further comprises an ion mirror arranged in an ion path from the ion source and in an ion path to the detector. The ion mirror is constructed to generate an electric field that changes as a function of position along the path from the ion source to the detector. The ion mirror is constructed to also generate an electric field that changes as a function of time. The electric field in the mass spectrometer is provided to focus ions from the ion source on the detector.

The magnitude of a spatial distribution of the electric field generated by said ion mirror can be changed as a function of time. The shape of a spatial distribution of the electric field generated by the ion mirror can also change as a function of time. In one embodiment, the electric field generated by the ion mirror changes linearly as a function of position along said path from the ion source to the detector. In another embodiment, the electric field generated by the ion mirror changes non-linearly as a function of position along the path from the ion source to the detector.

Another aspect of the present invention is to provide a method of measuring the mass-to-charge ratio of an ion. The method includes accelerating an ion from a source to a detector with an electric field that is both spatially and temporally non-constant, detecting the ion, and determining a time-of-flight of the ion.

The method may further comprise focusing the ion on a detector using an ion mirror that produces an electric field that is both spatially and temporally non-constant.

BRIEF DESCRIPTION OF THE DRAWINGS

These and other objects and features of the invention will become more apparent and more readily appreciated from the following detailed description of the presently preferred exemplary embodiments of the invention, taken in conjunction with the accompanying drawings, of which:

FIGS. 5A'-D' are the graphs of the temporal distribution versus the initial energy;

DETAILED DESCRIPTION OF SEVERAL EXEMPLARY EMBODIMENTS OF THE INVENTION

One aspect of the present invention is to provide a time-of-flight mass spectrometer that uses a combination of static and dynamic non-linear electric fields (that is, electric fields that are non-linear in both space and time) to achieve the best resolving power in the analysis of any initial 3-dimensional gas-phase ion population.

Figure 1A:
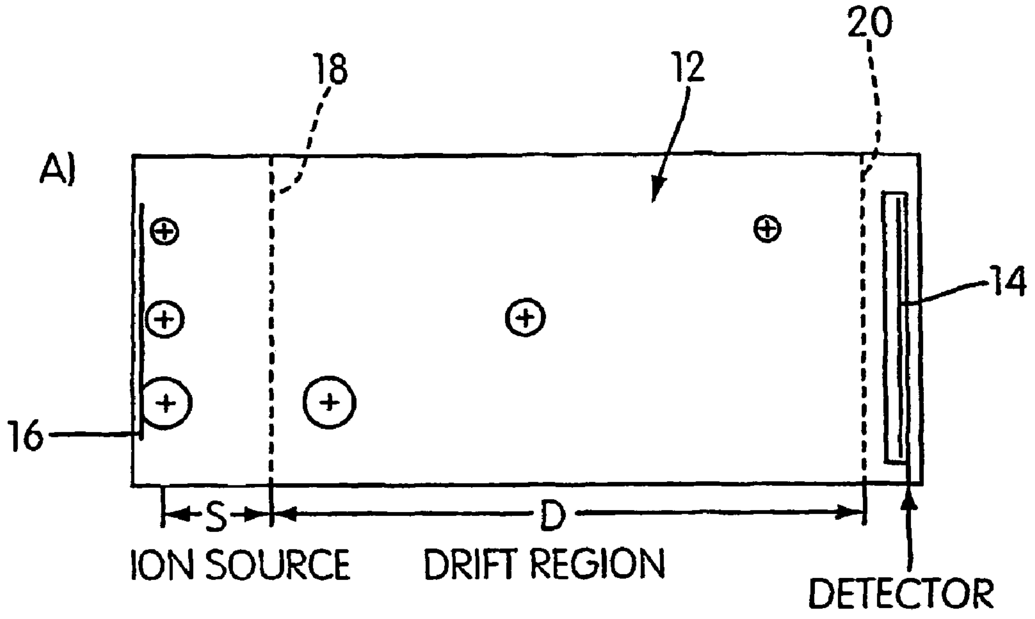
FIG. 1A PRIOR ART
FIG. 1A is a schematic representation of a conventional time-of-flight spectrometer.
Figure 1B:
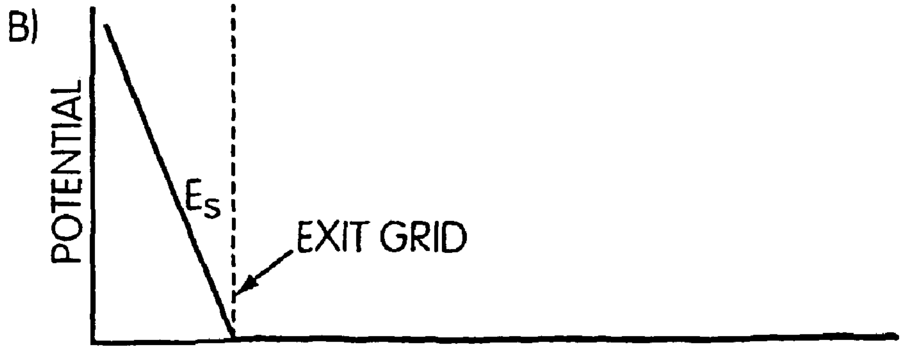
FIG. 1B PRIOR ART
FIG. 1B is a linear electrical potential profile applied in the ion source of a time-of-flight spectrometer of FIG. 1A.
Figure 2:
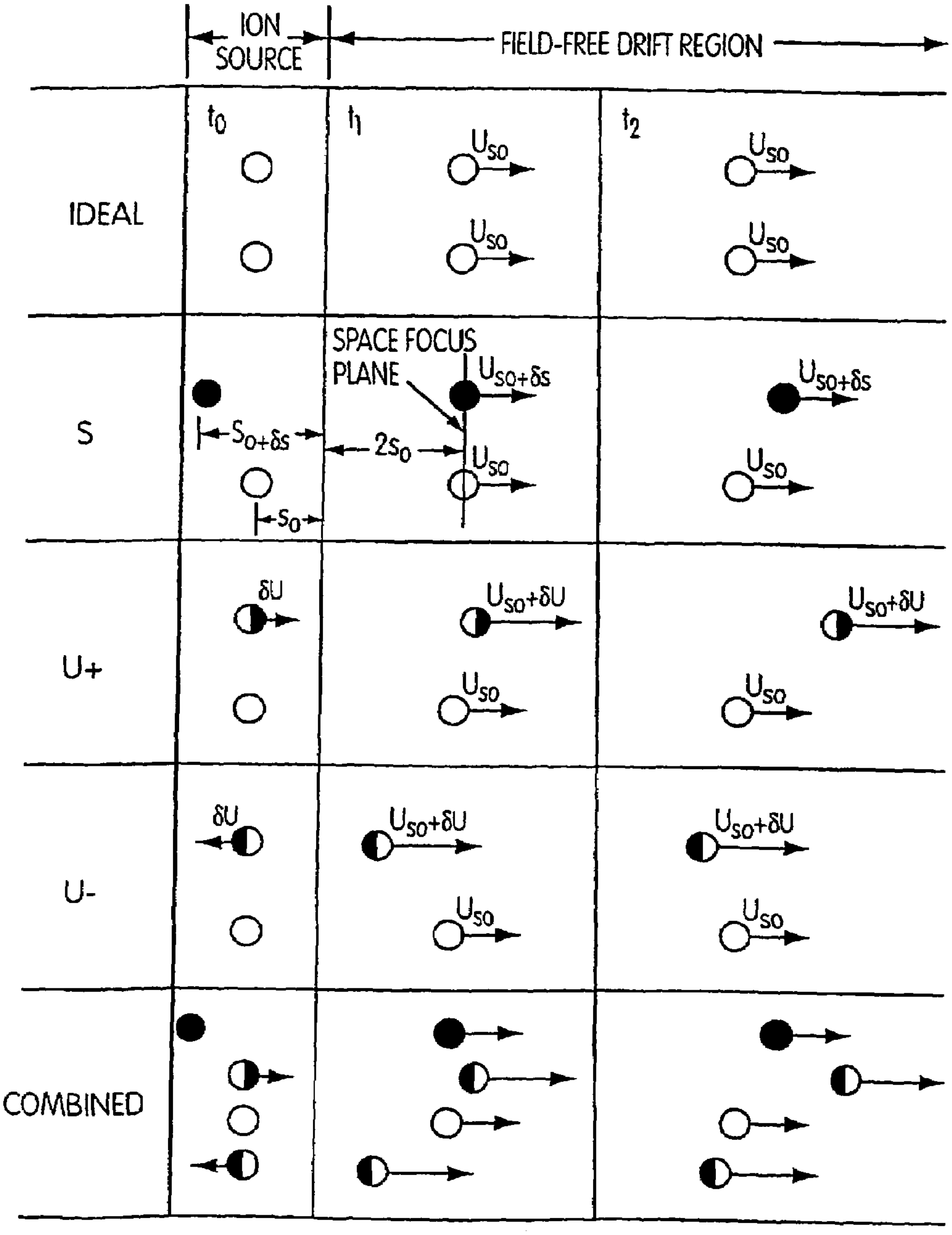
FIG. 2 PRIOR ART
FIG. 2 is a schematic diagram showing models of ion behavior patterns leading to diminished resolving power.
Figure 3A:
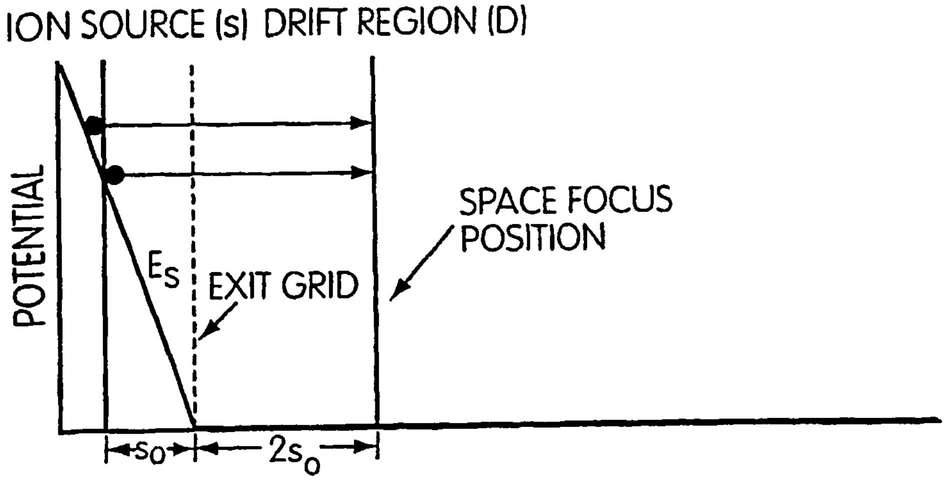
FIG. 3A PRIOR ART
FIG. 3A is a linear electrical potential profile and its relation with the space focus region.
Figure 3B:
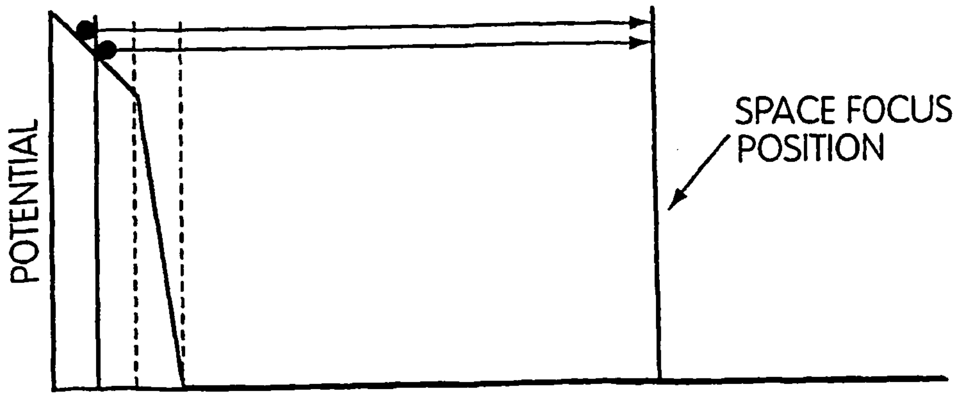
FIG. 3B PRIOR ART
FIG. 3B is a two-field electrical potential profile and its relation with the space focus region.
Figure 4A:
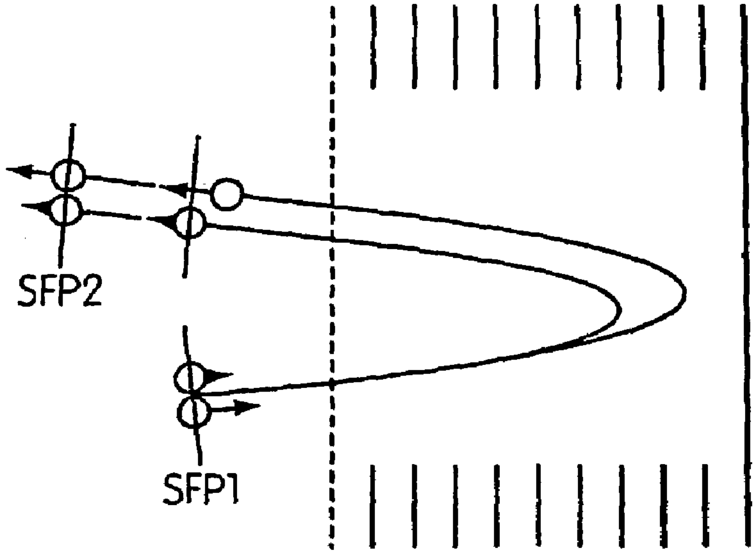
FIG. 4A PRIOR ART
FIG. 4A is a schematic representation of a conventional ion mirror.
Figure 4B:
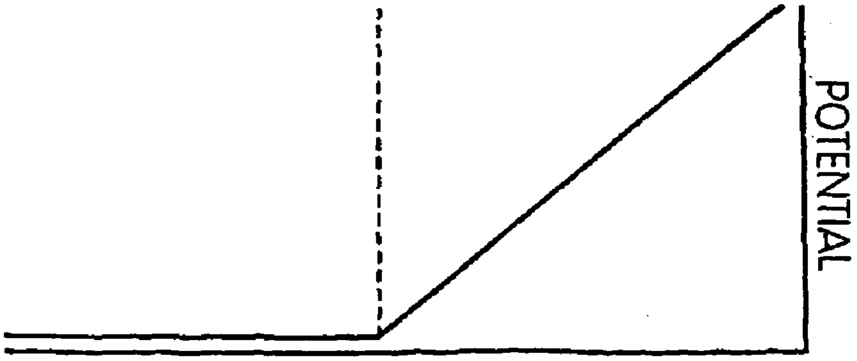
FIG. 4B PRIOR ART
FIG. 4B is a retarding electric field applied in the ion mirror shown in FIG. 4A.
Figure 5A:
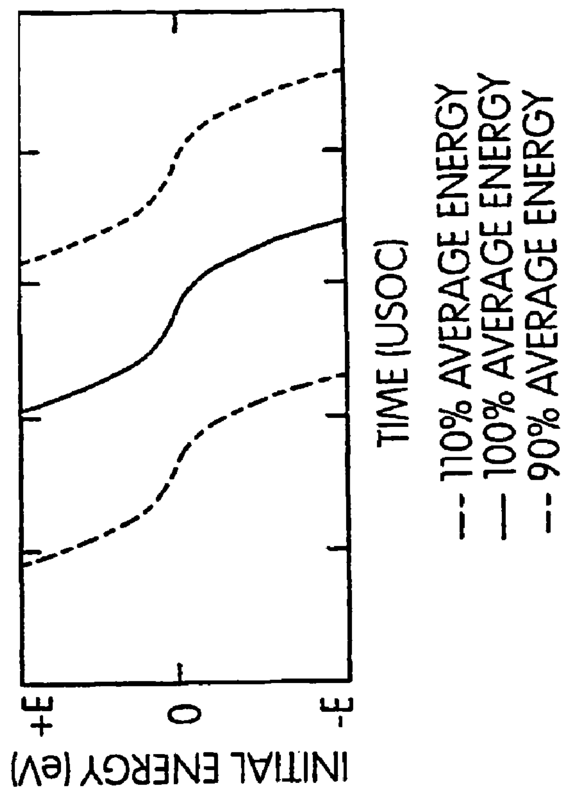
FIGS. 5A-D are the graphs of various linear and non-linear potential fields applied to the ion source as a function of distance.
Figure 5A:
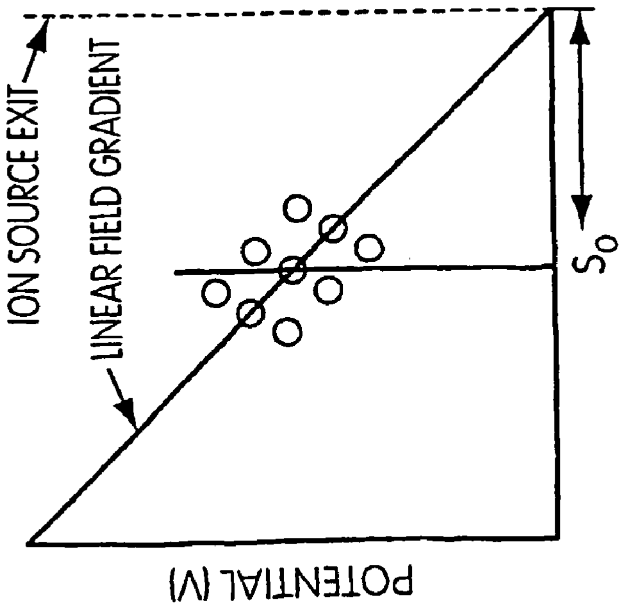
Figure 5B:
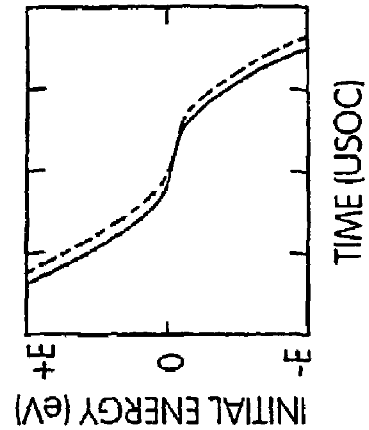
Figure 5B:
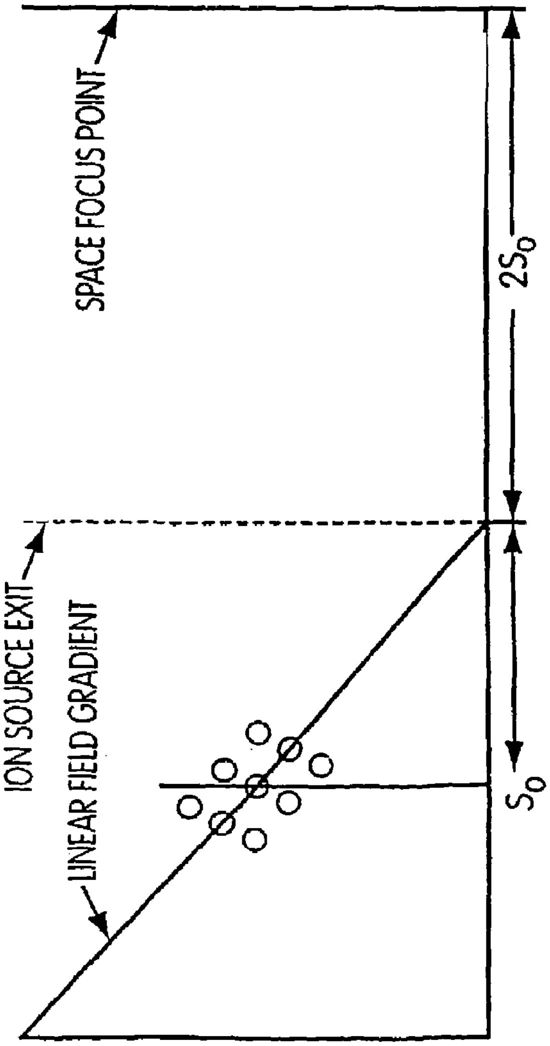
Figure 5C:
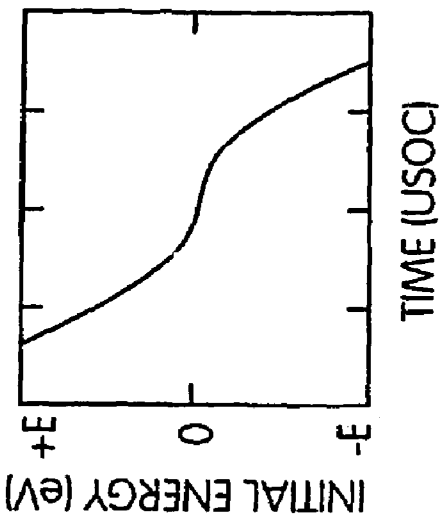
Figure 5C:
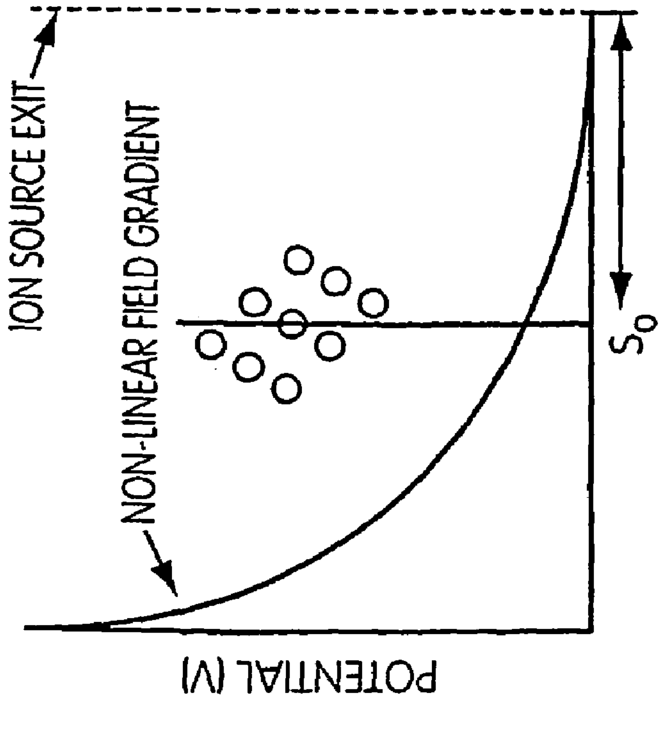
Figure 5D:
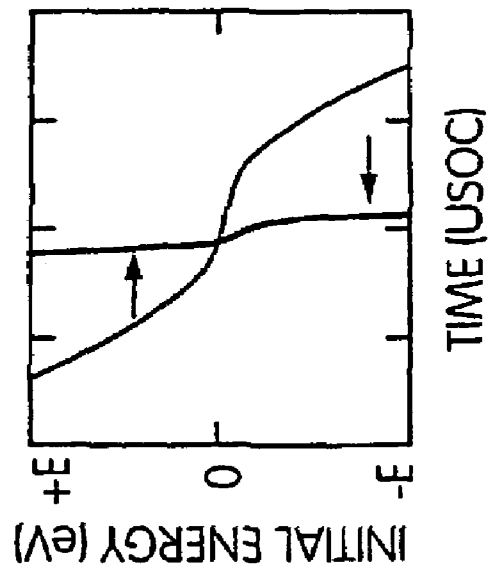
Figure 5D:
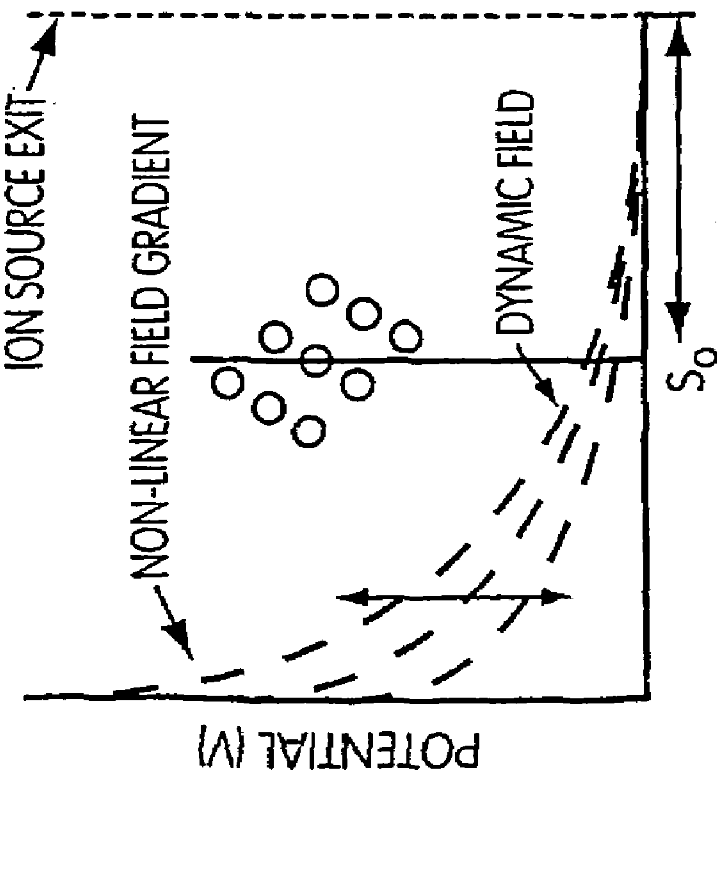
Figure 6:
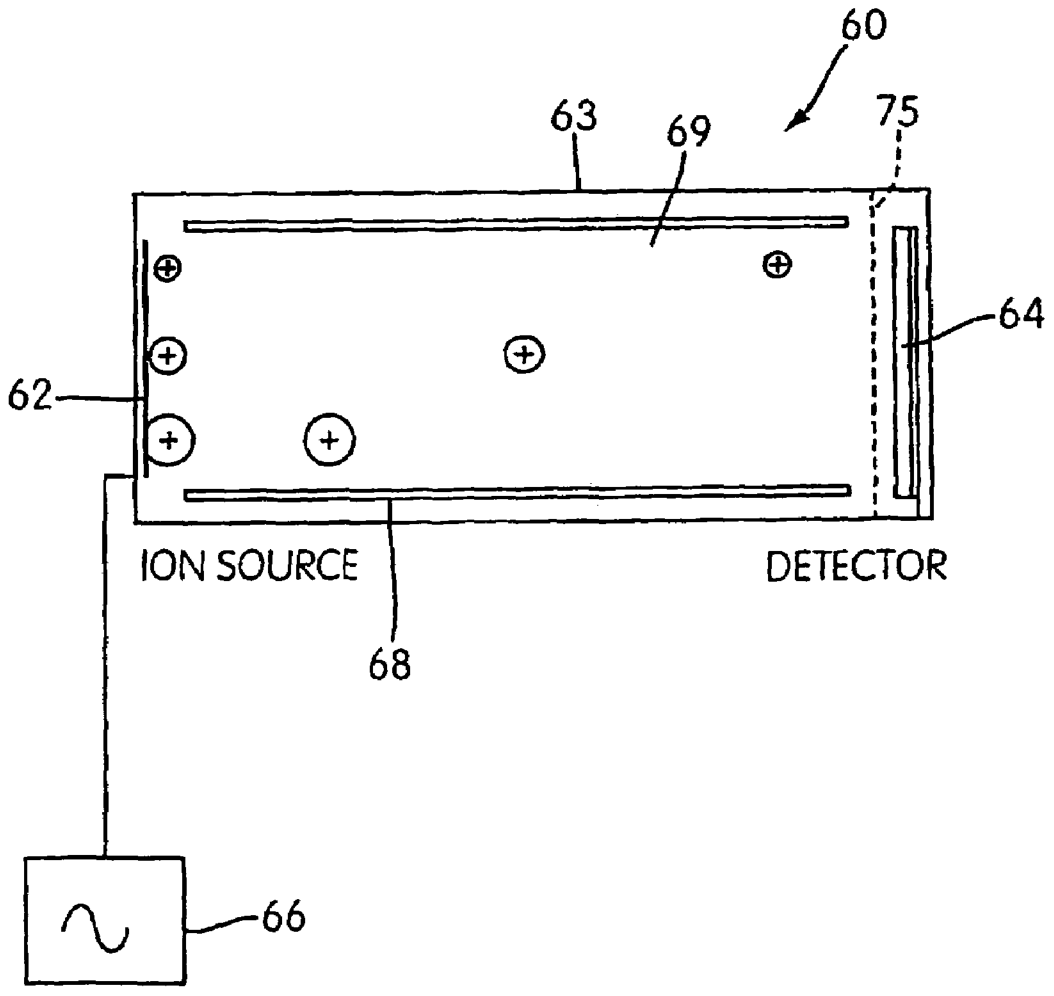
FIG. 6 is a schematic representation of a non-linear time-of-flight mass spectrometer using a non-linear electric field according to an embodiment of the present invention.

In one embodiment shown in FIG. 6, the mass spectrometer 60 includes ion source 62, an evacuated tube 63 proximate the ion source 62 and adapted to receive ions from the ion source. The mass spectrometer 60 also includes detector 64 disposed at an end of the evacuated tube 63 opposite an end proximate the ion source 62.

The ion source 62 includes sample holder or sample probe for holding a sample to be mass analyzed. The ion source 62 also comprises a voltage source 66 that can be modulated in time to generate an electric field that can change as a function of time.

The ions are formed and accelerated by an electric field defined by the non-linear potential imposed along the region 69, which is bounded by sample holder 62 and detector grid 75. This non-linear potential results by adding one or more electrodes 68 for shaping the lines of electric field in the region 69. A spatial non-linear electric field is thus generated between the ion source 62 and the detector 64. The non-linear electric field is provided to accelerate ions continuously from the ion source 62 to the detector 64. A detailed description of spatial non-linear electric field can be found in a co-pending application entitled "Non-Linear Time-of-Flight Mass Spectrometer", U.S. patent application Ser. No. 10/516,255, the entire contents of which are herein incorporated by reference. In particular, as detailed in the co-pending application, electrode 68 may comprise a cylindrically-shaped electrode that is positioned orthogonally between sample holder 62 and detector grid 75 to encompass region 69.

Figure 7B:
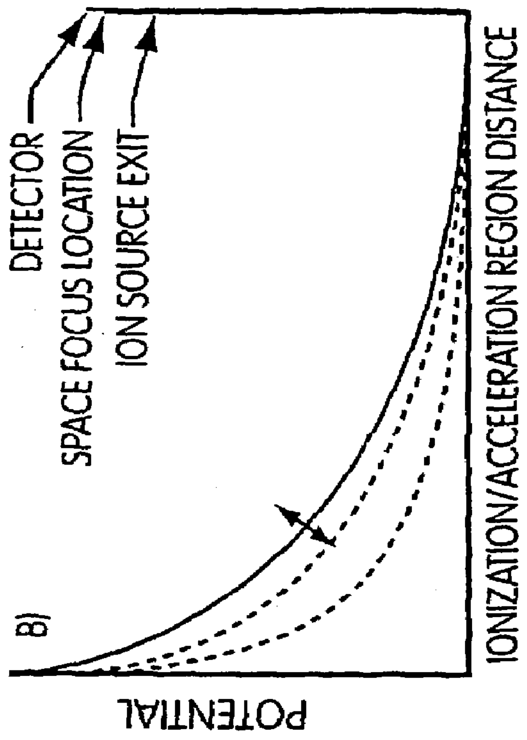
FIGS. 7A and 7B are profiles of a non-linear electric field in the ion source as function of the ionization/acceleration region distance.
Figure 7A:
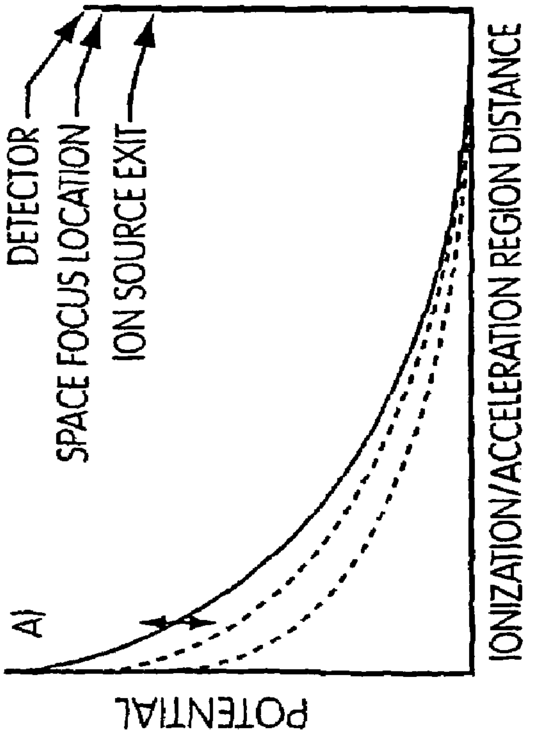

FIG. 7A and FIG. 7B show the profile of the non-linear electric field as function of the ionization/acceleration region distance, i.e spatial profile of the non-linear electric field. The dotted curves indicate the variation of the non-linear electric field with time as illustrated by the arrow. As shown in FIGS. 7A and 7B, the magnitude of a spatial distribution of the electric field (in ordinate) can be varied as a function of time (the arrow on the non-linear curve) by the application of a non-linear time dependent voltage to ion source 62 via modulated voltage source 66. Hence, the shape of a spatial distribution of the electric field in the mass spectrometer can also change as a function of time.

For the analysis of ion populations generated either from gas-phase molecules originating within the ion source 62 or those generated externally and subsequently transported to the ion source 62, ion extraction can be configured to occur immediately once the ions are in the source. For other analysis techniques such as MALDI, a time delay could be imposed between the initial laser-induced ionization event and the application of the non-linear field to allow for the dissipation of neutral molecules and free-radical chemical species.

The ion source 62 can also provide a short-duration, high-amplitude voltage pulse prior to ion ejection from the source in order to bias an initial energy distribution of an ion population.

In another embodiment, the mass spectrometer further comprises an ion mirror arranged in an ion path from the ion source and in an ion path to the detector. The ion mirror is constructed to generate an electric field that changes as a function of position along the path from the ion source to the detector. The ion mirror is constructed to also generate an electric field that changes as a function of time. The electric field in the mass spectrometer is provided to focus ions from the ion source on the detector.

A dynamic waveform could be applied to the ion mirror or other electrostatic focusing device during the mass analysis cycle. This embodiment would include the application of a time-dependent field in combination with known non-linear-in-space devices, such as quadratic, curved field or endcap reflectrons, gridless reflectrons, or other non-linear reflectrons.

Figure 8C:
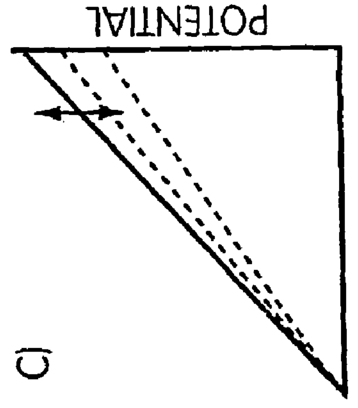
FIGS. 8A-C are profiles of a non-linear electric field in an ion mirror.
Figure 8B:
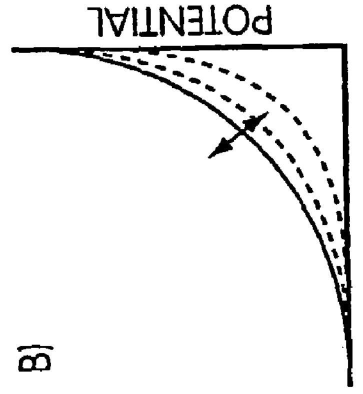
Figure 8A:
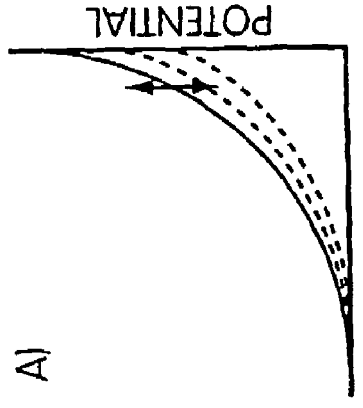

For example, as shown in FIGS. 8A-C, the magnitude of a spatial distribution of the electric field generated by the ion mirror can be changed as a function of time (as indicated by the arrow). The shape of a spatial distribution of the electric field generated by the ion mirror can also change as a function of time. In one embodiment, the electric field generated by the ion mirror changes linearly as a function of position along said path from the ion source to the detector (as shown in FIG. 8C). In another embodiment, the electric field generated by the ion mirror changes non-linearly as a function of position along the path from the ion source to the detector (as shown in FIGS. 8A and 8B).

Although the mass spectrometer of the present invention is shown in various specific embodiments, one of ordinary skill in the art would appreciate that variations to these embodiments can be made therein without departing from the spirit and scope of the present invention. For example, although the mass spectrometer has been described with the use of a laser as an ionizing source, one of ordinary skill in the art would appreciate that using electrospray, atmospheric pressure ionization (API) and atmospheric MALDI (APMALDI) is also within the scope of the present invention. The many features and advantages of the present invention are apparent from the detailed specification and thus, it is intended by the appended claims to cover all such features and advantages of the described apparatus which follow the true spirit and scope of the invention.

Furthermore, since numerous modifications and changes will readily occur to those of skill in the art, it is not desired to limit the invention to the exact construction and operation described herein. Moreover, the process and apparatus of the present invention, like related apparatus and processes used in mass spectrometry arts tend to be complex in nature and are often best practiced by empirically determining the appropriate values of the operating parameters or by conducting computer simulations to arrive at a best design for a given application. Accordingly, all suitable modifications and equivalents should be considered as falling within the spirit and scope of the invention.

We claim:

1. A time-of-flight mass spectrometer, comprising:
an ion source;
an evacuated tube proximate said ion source and adapted to receive ions from said ion source;
a detector disposed at an end of said evacuated tube opposite an end proximate said ion source;
an electrode having a substantially cylindrical shape and orthogonally positioned between said ion source and said detector;
wherein said mass spectrometer is constructed to generate an electric field that changes non-linearly as a function of position along substantially an entire path from said ion source to said detector, and
wherein said mass spectrometer is constructed to generate an electric field that changes as a function of time, said electric field being provided to continuously accelerate the ions from said ion source to said detector.

2. A time-of-flight mass spectrometer according to claim 1, wherein a magnitude of a spatial distribution of said electric field changes as a function of time.

3. A time-of-flight mass spectrometer according to claim 1, wherein a shape of a spatial distribution of said electric field changes as a function of time.

4. A time-of-flight mass spectrometer according to claim 1, further comprising an ion mirror arranged in an ion path from said ion source and in an ion path to said detector,
wherein said ion mirror is constructed to generate an electric field that changes as a function of position along said path from the entrance of said ion mirror to said detector, and
wherein said ion mirror is constructed to generate an electric field that changes as a function of time, said electric field generated by said ion mirror being provided to focus ions from said ion source on said detector.

5. A time-of-flight mass spectrometer according to claim 4, wherein a magnitude of a spatial distribution of said electric field generated by said ion mirror changes as a function of time.

6. A time-of-flight mass spectrometer according to claim 4, wherein a shape of a spatial distribution of said electric field generated by said ion mirror changes as a function of time.

7. A time-of-flight mass spectrometer according to claim 4, wherein said electric field generated by said ion mirror changes linearly as a function of position along said path from said ion source to said detector.

8. A time-of-flight mass spectrometer according to claim 4, wherein said electric field generated by said ion mirror changes non-linearly as a function of position along said path from said ion source to said detector.

9. A time-of-flight mass spectrometer according to claim 1, wherein said ion source further provides a delay pulse to allow for the dissipation of neutral molecules and free-radical chemical species.

10. A time-of-flight mass spectrometer according to claim 1, wherein said ion source further provides a short-duration, high-amplitude voltage pulse prior to ion ejection from the source in order to bias an initial energy distribution of an ion population.

11. A time-of-flight mass spectrometer, comprising:
an ion source;
an evacuated tube proximate said ion source and adapted to receive ions from said ion source;
a detector disposed at an end of said evacuated tube opposite an end proximate said ion source;
an electrode having a substantially cylindrical shape and orthogonally positioned between said ion source and said detector; and
an ion mirror arranged in an ion path from said ion source and in an ion path to said detector,
wherein said ion mirror is constructed to generate an electric field that changes nonlinearly as a function of position along said path from the entrance of said ion source to said detector, and
wherein said ion mirror is constructed to generate an electric field that changes as a function of time, said electric field being provided to focus ions from said ion source on said detector.

12. A time-of-flight mass spectrometer according to claim 11, wherein a magnitude of a spatial distribution of said electric field generated by said ion mirror changes as a function of time.

13. A time-of-flight mass spectrometer according to claim 11, wherein a shape of a spatial distribution of said electric field generated by said ion mirror changes as a function of time.

14. A time-of-flight mass spectrometer according to claim 11, wherein said electric field generated by said ion mirror changes linearly as a function of position along said path from said ion source to said detector.

15. A time-of-flight mass spectrometer according to claim 11, wherein said electric field generated by said ion mirror changes non-linearly as a function of position along said path from said ion source to said detector.

16. A time-of-flight mass spectrometer according to claim 11, wherein said ion source further provides a delay pulse to allow for the dissipation of neutral molecules and free-radical chemical species.

17. A time-of-flight mass spectrometer according to claim 11, wherein said ion source further provides a short-duration, high-amplitude voltage pulse prior to ion ejection from the source in order to bias an initial energy distribution of an ion population.

18. A method of measuring the mass-to-charge ratio of an ion, comprising:

arranging an ion source;

arranging an evacuated tube proximate said ion source and adapted to receive ions from said ion source;

arranging a detector disposed at an end of said evacuated tube opposite an end proximate said ion source;

arranging an electrode having a substantially cylindrical shape and orthogonally positioned between said ion source and said detector;

generating an electric field between the ion source and the detector that changes non-linearly as a function of position along substantially an entire path from said ion source to said detector and that changes as a function of time;

accelerating an ion continuously from a source to a detector;

detecting said ion; and determining a time-of-flight of said ion.

19. A method of measuring the mass-to-charge ratio of an ion according to claim 18, further comprising focusing said ion on a detector using an ion mirror that produces an electric field that is both spatially and temporally non-constant.

* * * * *